(12) United States Patent
Narain et al.

(10) Patent No.: US 9,203,971 B2
(45) Date of Patent: *Dec. 1, 2015

(54) METHOD AND APPARATUS FOR ESTABLISHING COMMUNICATIONS WITH A REMOTE NODE ON A SWITCHED NETWORK BASED ON HYPERTEXT CALLING RECEIVED FROM A PACKET NETWORK

(75) Inventors: Alfredo José Narain, Pembroke Pines, FL (US); Angel German, Miami, FL (US); Michael Anthony Wilson, Pembroke Pines, FL (US)

(73) Assignee: Focal IP, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,013

(22) Filed: Jun. 6, 2011

(65) Prior Publication Data

US 2011/0235794 A1  Sep. 29, 2011

Related U.S. Application Data

(63) Continuation of application No. 11/851,466, filed on Sep. 7, 2007, now Pat. No. 7,957,368, which is a continuation of application No. 10/353,695, filed on Jan. 29, 2003, now Pat. No. 7,274,686, which is a continuation of application No. 09/309,535, filed on May 11, 1999, now Pat. No. 6,535,506.

(51) Int. Cl.
*H04L 12/66* (2006.01)
*H04M 3/42* (2006.01)
(Continued)

(52) U.S. Cl.
CPC .............. *H04M 7/003* (2013.01); *H04L 12/66* (2013.01); *H04M 7/0009* (2013.01); *H04L 12/58* (2013.01); *H04M 3/5191* (2013.01)

(58) Field of Classification Search
CPC ... H04L 12/66; H04L 65/1013; H04L 65/172; H04L 65/4061
USPC ............... 370/259, 352, 356, 401; 379/88.17, 379/93.07, 93.24, 201.01, 207.02; 709/203, 709/218, 227, 249
See application file for complete search history.

(56) References Cited

U.S. PATENT DOCUMENTS

| 5,715,314 A | 2/1998 | Payne et al. |
| 5,740,549 A | 4/1998 | Reilly et al. |

(Continued)

FOREIGN PATENT DOCUMENTS

| EP | 0740445 | 10/1996 |
| WO | WO-9722210 | 6/1997 |

OTHER PUBLICATIONS

Agendize, "Click-to-Call—Make it easy for customers to call your business", Website: http://www.agendize.com/features/click-to-call (Copyright 2013), 3 Pages.

(Continued)

*Primary Examiner* — Alpus H Hsu
(74) *Attorney, Agent, or Firm* — Blakely, Sokoloff, Taylor & Zafman

(57) ABSTRACT

Disclosed is a system and a methodology enabling a first provider party to provide to a second recipient party software and services to enable the recipient party to embed in an Internet e-mail of the recipient party directed to an addressee, an HTML hyperlink file which includes a telecommunication initiating trigger, sending the e-mail to the addressee via the Internet, the addressee upon receiving the e-mail actuating the hyperlink via its trigger and, responsive to the trigger actuation, connecting the addressee via the Internet to a web page located on an Internet server, wherein the web page includes a request for a telephone number of the addressee. The addressee entering its telephone number information at the server, which information is communicated to a database associated with the server, the server communicating with the database and with a telephony switch, including sending to the switch instructions which result in the switch originating and managing a public switched telephone network (PSTN) communication between the recipient party and the addressee.

30 Claims, 3 Drawing Sheets

(51) Int. Cl.
*H04M 11/00* (2006.01)
*G06F 15/00* (2006.01)
*H04M 7/00* (2006.01)
*H04L 12/58* (2006.01)
*H04M 3/51* (2006.01)

(56) References Cited

U.S. PATENT DOCUMENTS

| | | |
|---|---|---|
| 5,818,836 A | 10/1998 | DuVal |
| 5,838,682 A | 11/1998 | Dekelbaum et al. |
| 5,884,032 A | 3/1999 | Bateman et al. |
| 5,963,952 A | 10/1999 | Smith |
| 5,995,606 A | 11/1999 | Civanlar et al. |
| 5,999,965 A | 12/1999 | Kelly |
| 6,009,469 A | 12/1999 | Mattaway et al. |
| 6,031,904 A | 2/2000 | An et al. |
| 6,091,808 A | 7/2000 | Wood et al. |
| 6,097,804 A | 8/2000 | Gilbert et al. |
| 6,108,704 A | 8/2000 | Hutton et al. |
| 6,130,933 A | 10/2000 | Miloslavsky |
| 6,131,121 A | 10/2000 | Mattaway et al. |
| 6,178,453 B1 | 1/2001 | Mattaway et al. |
| 6,185,184 B1 | 2/2001 | Mattaway et al. |
| 6,185,194 B1 | 2/2001 | Musk et al. |
| 6,192,123 B1 | 2/2001 | Grunsted et al. |
| 6,226,678 B1 | 5/2001 | Mattaway et al. |
| 6,252,944 B1 * | 6/2001 | Hansen et al. ............... 379/67.1 |
| 6,259,774 B1 | 7/2001 | Miloslavsky |
| 6,269,336 B1 | 7/2001 | Ladd et al. |
| 6,275,490 B1 | 8/2001 | Mattaway et al. |
| 6,282,281 B1 | 8/2001 | Low |
| 6,304,637 B1 * | 10/2001 | Mirashrafi et al. ......... 379/88.17 |
| 6,347,085 B2 | 2/2002 | Kelly |
| 6,377,568 B1 | 4/2002 | Kelly |
| 6,385,646 B1 | 5/2002 | Brown et al. |
| 6,426,955 B1 | 7/2002 | Gossett Dalton, Jr. et al. |
| 6,445,694 B1 * | 9/2002 | Swartz .......................... 370/352 |
| 6,456,699 B1 | 9/2002 | Burg et al. |
| 6,463,565 B1 | 10/2002 | Kelly et al. |
| 6,493,447 B1 * | 12/2002 | Goss et al. ............... 379/265.09 |
| 6,502,127 B1 | 12/2002 | Edwards et al. |
| 6,513,066 B1 | 1/2003 | Hutton et al. |
| 6,526,042 B1 | 2/2003 | Pinard et al. |
| 6,549,612 B2 | 4/2003 | Gifford et al. |
| 6,587,458 B1 | 7/2003 | Burg et al. |
| 6,594,254 B1 | 7/2003 | Kelly |
| 6,657,990 B1 | 12/2003 | Dilip et al. |
| 6,687,738 B1 | 2/2004 | Hutton et al. |
| 6,701,365 B1 | 3/2004 | Hutton et al. |
| 6,707,811 B2 * | 3/2004 | Greenberg et al. ........... 370/352 |
| 6,714,536 B1 | 3/2004 | Dowling |
| 6,728,784 B1 | 4/2004 | Mattaway |
| 6,731,626 B1 * | 5/2004 | Neyman ........................ 370/352 |
| 6,772,394 B1 * | 8/2004 | Kamada ........................ 715/210 |
| 6,775,369 B1 * | 8/2004 | McClung ................. 379/211.04 |
| 6,785,266 B2 | 8/2004 | Swartz |
| 6,816,880 B1 * | 11/2004 | Stent et al. .................... 709/202 |
| 6,829,645 B1 | 12/2004 | Hutton et al. |
| 6,870,828 B1 * | 3/2005 | Giordano, III ................ 370/352 |
| 6,944,278 B1 | 9/2005 | Nielsen |
| 7,289,485 B1 * | 10/2007 | Srinivasan .................... 370/351 |
| 7,302,051 B1 * | 11/2007 | Strandberg ............... 379/210.01 |
| 7,486,664 B2 | 2/2009 | Swartz |
| 7,512,117 B2 | 3/2009 | Swartz |
| 7,676,762 B2 | 3/2010 | Shafron |
| 2002/0164003 A1 * | 11/2002 | Chang et al. ................ 379/93.05 |
| 2006/0129937 A1 | 6/2006 | Shafron |
| 2008/0144796 A1 | 6/2008 | Ringland et al. |

OTHER PUBLICATIONS

Allen, McKay, "Call Tracking: Practice Safe Click-To-Call Advertising", Website: http://blog.logmycalls.com/bid/261301/Call-Tracking-Practice-Safe-Click-To-Call-Advertising (Copyright 2013), (Jan. 21, 2013), 3 Pages.

Allen, McKay, "Click-to-Call via Call Tracking = Online Close Rate Explosion", Website: http://blog.logmycalls.com/bid/261299/Click-to-Call-via-Call-Tracking-Online-Close-Rate-Explosion, (Jan. 21, 2013), 3 Pages.

Brilliant, Jeb, "Click to Call Buttons", Website Blog: http://www.phone.com/blog/2011/07/21/click-to-call-buttons-2, (Jul. 21, 2011), 2 Pages.

Click to Call Service, "Click to Call Service—CallMe!—News about our services", Website: http://www.clicktocall.eu/news.php (Copyright 2012), 9 Pages.

Easy Call Now, "Get your online customers talk to you from the website, instantly!", Website: http://www.easycallnow.com/index.php?page=login (Copyright 2009), 1 Page.

Eck, David, "Web Publishing Lab: Creating Web Pages with Netscape Composer", Website: http://math.hws.edu/TMCM/java/labs/WebPublishingLab.html, (Oct. 1997), 8 Pages.

Gravelle, Robert, "HTML5 Forms: How to Use the New Email, URL, and Telephone Input Types", Website: http://www.htmlgoodies.com/html5/tutorials/whats-new-in-html5-forms-email-url-and-telephone-input-types (Copyright 2013), 6 Pages.

Hansson, Allan, et al., "Phone Doubler—A Step Towards Integrated Internet and Teleophone Communities", Ericsson Review No. 4, 1997, pp. 142-151.

Instant, "Table of Contents, About Instant Call", www.instantcall.com, (Apr. 16, 1999), 1 Page.

Instant Call, "How the Instant Call Buttons Works: A web callback service of USA Global Link", Website: http://web.archive.org/web/20000824001516/http://www.instantcall.com/howwork/ Copyright 1998 (Download date: Aug. 24, 2000), 2 Pages.

J2 Global Inc, Non-Final Office Action mailed May 4, 2005 for U.S. Appl. No. 10/353,695.

J2 Global, Inc., Non-Final Office Action mailed Sep. 22, 2010 for U.S. Appl. No. 11/851,466.

J2 Global, Inc., Non-Final Office Action mailed Jul. 10, 2002 for U.S. Appl. No. 09/309,535.

Lu, H, et al., "Toward the PSTN/Internet Inter-Networking—Pre-PINT Implementations (RFC2458)", ip.com, Technical Disclosure, IP.com No. IPCOM000003036D, Original Publication Date: Nov. 1, 1998, IP.com Electronic Publication: Sep. 13, 2000, 49 pages.

Palme, Jacob, "Now You Can Send Web Pages in E-mail!", Website: http://people.dsv.su.se/~jpalme/ietf/web-email.html, (Apr. 11, 1998 revised Dec. 22, 2001), 6 Pages.

Phone.com, "Click to Call Buttons"; Website: http://www.phone.com/features/click-to-call-buttons/ (Copyright 2013), 2 Pages.

Priva Com B.V., "Untitled Document", www.privanet.com, (Apr. 17, 1999), 5 Pages.

Ringcentral Professional, "VoIP Click to Call Me Service Feature—RingCentral Professional", Website: http://www.ringcentral.com/features/click-to-call-me/overview.html (Copyright 1999-2013), 1 Page.

Schulzrinne, Henning, et al., "A Comparison of SIP and H.323 for Internet Telephony", Proceedings of the 1998 Workshop on Network and Operating System Support for Digital Audio and Video (NOSSDAV '98), Jul. 1998, Cambridge, England, pp. 1-4.

Twilio, "Twilio Docs—How to Click to Call", Website: http://www.twilio.com/docs/howto/click-to-call (Copyright 2009-2013), 3 Pages.

USA Global Link, News Release, www.instantcall.com, (Apr.-May 1999), 3 Pages.

USA Global Link, "Install Call, Answers to Frequently Asked Questions", www.instantcall.com, (Apr.-May 1999), 1 Page.

USA Global Link, "Instant Call, How Instant Call_ Works", www.instantcall.com, (Apr.-May 1999), 1 Page.

USA Global Link, "Instant, About Instant Call", www.instantcall.com, (Apr. 29, 1999), 2 Pages.

USA Global Link, "Instant, ABout Instant Call, Alternative Contact Method", www.instantcall.com, (Apr. 29, 19999), 2 Pages.

USA Global Link, "Instant, About Instant Call, Flexible Features", www.instantcall.com, (Apr. 29, 1999), 2 Pages.

USA Global Link, "Instant, About Instant Call, Instant Phone Connection", www.instantcall.com, (Apr. 29, 1999), 1 Page.

USA Global Link, "Instant, Representative Program", www.instantcall.com, (Apr. 16, 1999), 1 Page.

USA Global Link, "Instant, Sign Up!", www.instantcall.com, (Apr. 16, 1999), 1 Page.

(56) References Cited

OTHER PUBLICATIONS

USA Global Link, "Top Industrial Publisher Introduces Instant Call Buttons at National Manufacturing Conference", Website: http://web.archive.org/web/20000416144434/http://www.usagl.com/ourcompany/announcements/031599_ieninstantcall.htm, (Mar. 15, 1999), 1 Page.

USA Global Link, "Usa Global Link Brings Interactivity to Internet Shopping", Website: http://web.archive.org/web/20010405052712/http://www.usagl.com/ourcompany/anouncements/instant_callback_unveiled.html, (Oct. 7, 1998), 1 Page.

USA Global Link, "We'll Call you for Free", www.instantcall.com, (Apr. 6, 1999), 1 Page.

* cited by examiner

METHOD AND APPARATUS FOR ESTABLISHING COMMUNICATIONS WITH A REMOTE NODE ON A SWITCHED NETWORK BASED ON HYPERTEXT CALLING RECEIVED FROM A PACKET NETWORK

INDEX TO RELATED APPLICATIONS

This application is a Continuation of U.S. patent application Ser. No. 11/851,466 filed Sep. 7, 2007, now U.S. Pat. No. 7,957,368 issued Jun. 7, 2011 which is a Continuation of U.S. patent application Ser. No. 10/353,695, filed Jan. 29, 2003, now U.S. Pat. No. 7,274,686 issued Sep. 25, 2007 which is a Continuation of U.S. patent application Ser. No. 09/309,535, filed May 11, 1999, which is now U.S. Pat. No. 6,535,506 issued Mar. 18, 2003.

TECHNICAL FIELD

The present invention relates to data communications terminals and networks, switched telephone networks, initiating communications connectivity on a switched network in response to hyperlink supplied data retrieved from a packet data network, and more particularly to the system and methodology for establishing and enabling the use of such networks.

BACKGROUND ART

Telephone marketing and sales systems have been used by merchants for years to remotely accept orders from consumers without requiring a trip to a retail establishment. Merchants have traditionally advertised their products for sale to the public using print, radio and television media frequently including a telephone number for consumers to call to obtain further information and place orders for their products. Sales representatives at a centralized merchant sales facility answer the customer calls, answer questions and place orders for products.

Typically a merchant telephone sales facility includes sales representative stations. Such stations are each equipped with computer terminals for accessing product database and ordering systems. Each station further has a telephone. Incoming telephone calls from customers, placed using telephones at the customer premises, are carried by a Public Switched Telephone Network (PSTN) to the merchant telephone sales facility. Here the incoming lines are terminated at an automatic call distributor (ACD). The ACD monitors the sales representative stations for availability and activity, and routes the incoming calls to the telephone of the appropriate available sales representative. The ACD may include other functionality, such as receipt and display on the appropriate telephone of the telephone number of the calling party, using calling number identification (CID) data supplied by the PSTN.

Upon acceptance of an incoming telephone call, a sales representative solicits information from the calling party to determine the nature of the call, e.g., the product of interest to the caller, the type of information being sought, etc. The sales representative may also use the CID information to access any records about that customer that may be stored on a product database and ordering system. The ACD may further include a voice response unit (VRU) to automatically solicit preliminary information from customers, record the responses, route the call to an appropriate sales representative, and display or playback any recorded responses.

A disadvantage of such a prior art telephone marketing method is that there is no automatic way for the sales representative to know what materials prompted the customer to place the call or what information has been reviewed by the customer immediately prior to the call. Further, the sales representative must convey all information to the caller orally or by mailing or faxing information, such as graphic literature. Because the caller may not obtain sufficient or satisfactory types of information orally, and because of the delays and inability to interactively access the customer's needs if information is sent via mail or facsimile, the customer's product evaluation and selection process may be compromised and/or sales may be lost.

In addition to conventional print, radio and television advertising, merchants are increasingly making information available, and accepting orders over electronic data links. Using a home computer, a potential customer may access a merchant's electronic catalog system, obtain product information, and may place orders. While some merchants maintain dedicated computers called "servers" to provide dedicated dialup service over the PSTN, an increasing number of businesses are accessible over the Internet. In particular, the graphics capabilities and hot links (also referred to as hot spots, hyperlinks, and hypertext) supported by hypertext transport protocol (HTTP) of the Worldwide Web (WWW) sites of the Internet, have resulted in many merchants offering their own home pages advertising their products and services.

A "client" or potential customer can access the WWW of the Internet using a home, desktop, or personal computer (PC), running web browser software such as Netscape or Internet Explorer. The client personal computer, or the like, running the browser software, has communications interfacing means for connecting to and communicating with remote servers or web sites on the Internet, conventionally via a client server. The browser software displays textual and graphical information retrieved from the web on a video display or monitor. Digital audio information is conventionally played either through speakers internal to the PC or auxiliary external speakers. Control of and data entry into the PC is provided by a keyboard and graphical input device, i.e., mouse. In particular, the user moves a cursor displayed on the monitor to designate a desired portion of the display.

The browser software provides a tool for the user to navigate the web and other types of Internet sites (e.g., FTP file transfer protocol and Gopher sites), without having to know the lengthy uniform resource locator (URL) addresses of the sites to be accessed. Instead of entering the URL, the user employs the mouse to click on a highlighted portion of text (known as "hypertext") or graphics (together known as "hyperlinks"), to retrieve associated information. The browser interprets the hypertext formatted as hypertext markup language (HTML) and transmitted using hypertext transfer protocol (HTTP). If the hypertext points to an information source outside of the current hypertext page, it initiates a service request to the URL associated with the selected hypertext. Thus, each page of information in HTML format includes not only text and graphics, but the embedded addresses of sites having related information.

Most Internet applications, including HTTP, follow a client server model. One computer system, called the server, runs the hypertext database part of the application. The server is provided by a merchant or other information source maintaining a home page on the web. Other computers, called clients, request services from the server, usually in the form of information requests. On a UNIX system the server part of the application normally runs in the background and is called a "daemon," pronounced "demon." Servers are identified by the type of service involved. Therefore, a system running the HTTP server daemon is called an HTTP server. A given computer system can have multiple servers running simultaneously. Thus, a single server might simultaneously function as an HTTP server, an FTP server, and a LAN (local area network) server, as well as several other types of servers.

A transaction is initiated when the HTTP client requests a service or resource from the server. The client software uses a Unique Resource Identifier (URI) to determine where the desired resource resides on the Internet. A URI is either a Uniform Resource Locator (URL) or Uniform Resource Name (URN.) An URL specifies the actual location of the resource, while an URN identifies the place where the resource is located and must be translated into a an URL. In current practice URLs are always used for HTTP applications.

An HTTP server exists for the purpose of sending objects to a requester using the HTTP protocol. One such object is a Home Page. A Home Page is simply a document that has been composed or "markedup" using HTML.

A typical request-response scenario might proceed as follows. A user on a Microsoft Windows equipped operating system (OS) may be executing a Web Browser such as Netscape. The user clicks on a hot spot within the document that contains an URL. The browser recognizes the tag as identifying an URL, encapsulates it within an HTTP wrapper and passes it to the OS TCP stack, which includes code to handle the data. The OS then initiates a connection with the server's host system. Once the OS and the host system establish communication, the OS ships the request to the host. This request is passed through the various protocol layers to the HTTP daemon or server. The server interprets the request, checks its MIME (Multipurpose Internet Mail Extension) type, and sends the client the resource and information about the MIME type of the resource. When the OS receives the resource it passes it back to the browser, which examines the response. If the returned object is an HTML document, the browser displays the document on the computer display screen. If the object is a MIME type that the browser cannot handle, it checks its associate table and launches the associated helper program software, passing the resource to it for processing. In the meantime, once the request has been satisfied, either the server or the client breaks the connection, thus freeing up the browser for another request.

While the Internet and, particularly the WWW, provide for rapid dissemination of data to potential customers, interactivity is limited to the retrieval of information under client request, i.e., the pull model server. That is, the customer has control over the information retrieved from the available pages of information on the merchants server. However, there is no means for the merchant to interactively guide the user through the various pages of information stored on the server. If a potential customer cannot locate or identify information on a product of interest, the merchant has no means to interactively assist, nor would the merchant even know of the dilemma of the customer.

An apparent lack of security is another problem that must be addressed by merchants in selling services and products on the Internet. These problems include an inability to verify the authenticity of a purchase or ability to pay for a purchase, particularly since the information may be compromised as it traverses the Internet. Therefore, many merchants rely on conventional telephone calls to take orders and accept credit card and other forms of payment. However, this requires that the potential customer identify the appropriate merchant telephone number, abandon their computer and possibly disconnect from their Internet access provider (ISP) in order to place a telephone call to the merchant.

Accordingly, it was perceived that a need existed for an Internet type browser system that would automatically initiate connectivity with a merchant over a switched telephone network, independent of the data network providing Internet connectivity with the merchant. It was further perceived that a need existed for an Internet type data retrieval system that would accommodate simultaneous and coordinated data transmission over a packet data network, and dedicated communications over a switched telephone network, between a user and a remote information provider site.

The system and method described in Dekelbaum et. al. U.S. Pat. No. 5,838,682 (682 patent), issued Nov. 17, 1998, has been offered, at least in part, in response to these and other needs.

The Dekelbaum et al. 682 patent describes a combination of network systems which includes an Internet type access arrangement having an autodialer for automatically establishing communications with the facility of a merchant over a switched network, while maintaining Internet connectivity over a packet data network. The autodialer, in combination with the merchant's server, coordinates between the Internet session and the newly established switched connectivity. The session history from the prior Internet session is supplied to a sales representative receiving the autodialed call. The sales representative is provided with a terminal for controlling the merchant's server to push data to the client in response to the interactive session simultaneously conducted over the switched network.

In a typical use of this system, a method of establishing connectivity with a remote site based on hypertext format messages is initiated by a user clicking on the appropriate hot spot or hypertext of the Merchant's Web page. This causes the Web Browser to encapsulate the appropriate URL with an HTTP wrapper and pass the message to the Windows operating system TCP stack. The operating system connects to and passes the request to the host server. The host server responds with the requested resource. The operating system receives and passes the resource to the browser, and the browser examines the MIME type to determine if it should launch the autodialer helper program. Alternatively, if the resource includes an applet, the executable content of the applet forms the autodialer, which is executed by the Web Browser directly. If the autodialer helper program is launched, it initiates a dialing sequence. Further information regarding the architecture and operation of this system may be obtained by reference to the above identified U.S. Pat. No. 5,838,682. That patent is incorporated by reference herein in its entirety.

In addition to the foregoing systems and methods proposed in the 682 patent, there is yet another hyperlink methodology now in use for initiating simultaneous data and voice communication over the Internet and the PSTN. This system is designed for use in a situation where a merchant deals with potential customers or end users of his services through an independent sales intermediary or reseller, i.e. an intermediary business. The reseller or intermediary then markets the product or service to merchants who rely on print and the like advertising and electronic commerce in marketing their products.

A survey by the Direct Marketing Association (DMA) found in 1999 that 95 percent of their respondents use the Internet for sales and marketing applications, up from 83 percent one year ago. The DMA reports that there has been a steady increase in the percentage of direct marketers having web sites, with 90 percent reporting a web presence this year.

Two-thirds of the direct marketing companies surveyed said that their web site is targeted toward other businesses.

Thus, it is apparent that there is a growing electronic commerce market, and in particular a business to business market. The foregoing review of the development of systems to handle this demand makes it apparent that there is a need for improved systems and methodology for using a hybrid packet data and switched network for handling business to business sales in organizations which handle a large volume of transactions with independent resellers or intermediaries.

A prior art proposal for meeting that need is illustrated in the system is shown in FIG. 3. FIG. 3 shows a system for using the Internet and a call button hyperlink on a home or web page of a reseller to initiate on the Internet a telephony connection between the reseller and a prospective customer. Such a prospective customer is sometimes referred to as an end user herein. The telephony connection may be maintained via a public switched communications network (PSTN), and exist simultaneously with the Internet connection.

Referring to FIG. 3, the Internet is shown as a cloud 300. The service providing merchant or service provider operates a web server 302 and a telephone switch 304. The site of an intermediary or reseller is indicated at 306. A potential end user customer of the intermediary or reseller is shown at 308. The reseller maintains a web site or page on the server 302. The web page of the reseller includes a hyperlink, which is indicated by a graphic display, such a button, highlighted text, or the like. The web page includes an invitation to press or activate the hyperlink button to initiate an immediate telephone call to the web page proprietor. In this instance, the web page is that of the reseller. When potential end user customer reaches the web page of the reseller by browsing or by address, he examines the content of the web page and encounters the invitation to click on the hyperlink button. This is shown by the broken line at 1 in FIG. 3.

Upon activation of the hyperlink by clicking on or "pressing" the button, the server 302 validates the request and signals the telephone switch 304 to place calls to the reseller 306 and to the prospective end user customer 308. This is shown by the broken line at 2 in FIG. 3. The telephone switch 304 thereupon calls the reseller 306 and indicates that the reseller has a hyperlink call. This is shown by the broken line 3. The switch then calls the potential customer. This is shown at 4 in FIG. 3. The two calls are then bridged together by the telephone switch. The web server may now send customer data via e-mail to the reseller, and a thank you e-mail to the customer.

Among the advantages claimed for this system are the following. A simple add-in button generates a personal interaction between the provider company and a prospect, helping to convert browsers to buyers. When an interested web shopper encounters a call button on a web site, they merely click on it, initiating a pop-up menu. The menu asks the user for a call back phone number of their choice, and a time for the call back, ranging from immediately to several hours. In this manner the shopper controls the timing of the return call. There is no need to dial an 800 number and wait for a reply, and there is no need for special software. No additional hardware, software or extra phone lines are needed for a business to start using the service. It allows the merchant customer to talk to his customers at the critical moment, when they are most interested in the product or service of the merchant. Questions may be immediately answered and obstacles to closing a sale removed.

A system of the general type just described has been used commercially in the United States by USA Global Link of Fairfield, Iowa 52556. Information is available at www.instantcall.com. Another seemingly similar service appears to be on the market by PrivaCom B.V. of the Netherlands. See http://privanet.com/cnt introduction.html.

While these prior systems and services have advantages, and have achieved a measure of success in the marketplace, they also are subject to disadvantages. A principal disadvantage resides in the fact that the audience of potential end user customers is primarily limited to those who reach the web site of the reseller by browsing or by seeking that site by address.

A need exists for a system and method of operation of a hybrid communication system employing a switched telephone network and a packet data network that implements push model methodology to initiate switched telephone network connectivity between a merchant and a prospective end user customer. A need exists for permitting either a service provider or a service reseller employing such a system to target prospective customers by address, rather than reliance on the prospective customers accessing the provider or the reseller's web page.

DISCLOSURE OF THE INVENTION

Objectives

It is one objective of the invention to overcome limitations and disadvantages inherent in the prior systems, and to meet presently existing needs and provide all the advantages claimed for the present systems.

It is another objective of the invention to enable a push model for a system and method of operation of a hybrid communication system employing a switched telephone network and a packet data network that implements push model methodology. The push model methodology initiates switched telephone network connectivity between a merchant and a prospective end user customer, independent of the prospective customer seeking out or browsing to a node of the merchant.

It is another objective of the invention to enable a push model for a system and method of operation of a hybrid communication system employing a switched telephone network and a packet data network that implements push model methodology to initiate switched telephone network connectivity between a merchant and a prospective end user customer, whose identity is selected by the merchant for solicitation, independent of the prospective customer seeking out or browsing to a node of the merchant.

It another object of the invention to provide a system and method for a merchant or reseller to proactively provide to a prospective customer an opportunity to interactively communicate with the merchant or reseller without first initiating connection with a presence of the merchant or reseller on a packet data network.

It is a still further object of the invention to provide a system and method for a merchant or reseller to use electronic mail to proactively provide to a prospective customer an opportunity to interactively communicate with the merchant or reseller, without first initiating connection with a presence of the specific merchant or reseller on a packet data network.

It is yet another object of the invention to implement a method of one entity sending to another entity by electronic mail a hypertext markup language (HTML) file containing a telecommunication initiating trigger.

It is another object to enable the recipient of an electronic mail message to immediately and automatically reach the sender via a connection over a switched telephone network.

It is a still further object of the invention to provide a system and method which enables recipient response to the electronic mail by actuation of any initiating trigger. This response to trigger actuation includes obtaining a telephone number of the actuating entity, and processing the telephone number information about that entity in consumer premises equipment (CPE). That CPE equipment includes a server, database, and switch. These are used to establish a telephony connection between the electronic mail originator and the recipient entity via the switch and a public switched telephone network (PSTN).

Further objects and advantages of the invention will be apparent from the following specification, claims and appended drawings.

SUMMARY OF THE INVENTION

The present invention involves a system and a methodology enabling one party to send to another party by electronic mail, a hypertext markup language (HTML) file containing a telecommunication initiating trigger, responding to actuation of the initiating trigger at least in part by obtaining a telephone number of the other party, with the telephone number being obtained at least in part by transmission control protocol/Internet protocol (TCP/IP) communication between the other party and a web page on a server, processing information about the other party including the telephone number, in consumer premises equipment (CPE) which includes a server, database and switch, to establish a telephony connection between the electronic mail originator and the recipient party via the switch and a public switched telephone network (PSTN).

More particularly the invention involves a system and a methodology enabling a first provider party to provide to a second recipient party software and services to enable the recipient party to embed an HTML hyperlink file in an Internet e-mail of the recipient party to an addressee. The hyperlink includes a telecommunication initiating trigger, which sends the e-mail to the addressee via the Internet. The addressee, upon receiving the e-mail, actuates the hyperlink by means of its trigger. In response to the trigger actuation, the addressee is connected via the Internet to a web page located on an Internet server, wherein the web page includes a request for a telephone number of the addressee. The addressee enters its telephone number information at the server. This information is communicated to a database associated with the server. The server communicates with the database and with a telephony switch, and sends to the switch instructions which result in the switch originating and managing a public switched telephone network (PSTN) communication between the recipient party and the addressee.

BEST MODE FOR CARRYING OUT THE INVENTION

Figure 1:
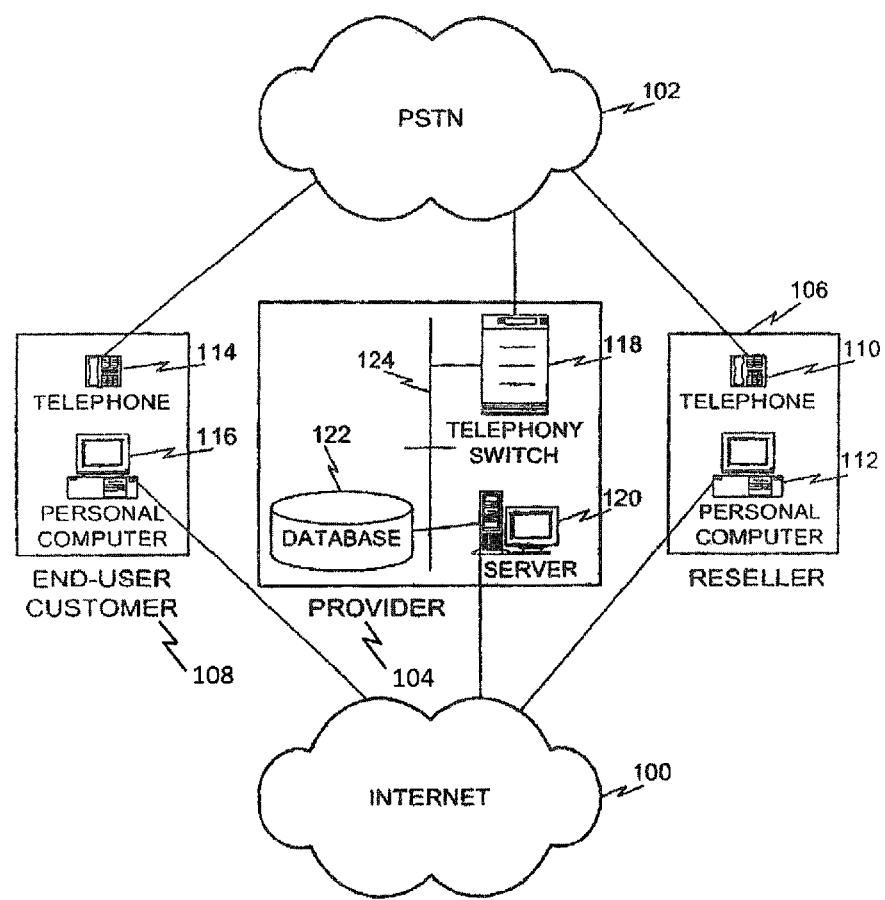
FIG. 1 is a simplified diagram of a packet data network such as the Internet, and a switched telephone network such as the PSTN, with the combined system including a server, database and a telephone switch.

Referring to FIG. 1, there is shown a simplified block diagram of a system according to one preferred embodiment of the invention. A packet data network, such as the Internet, is shown as a cloud 100. A public switched telephone network or PSTN is shown as a cloud 102. A service provider is shown at 104, and a reseller is indicated at 106. A prospective customer of the reseller is shown at 108. The service provider 104 is typically a company that supplies to resellers, such as the reseller 106, software and related services. This software and related services enable the reseller to implement the advertising and sale of push to talk buttons to end user customers, who may be merchants. Such sales are made by the resellers, with the necessary software and subsequent related services being provided by the service provider. The reseller is typically an independent contractor having contractual relations with the provider. The service provider may make sales to resellers or directly to end user customers.

The provider typically supplies the reseller with the software with which to implement his sales activities pursuant to the methodology of the invention. The reseller indicated at 106 maintains a telephone link to the PSTN shown at 110. This may constitute a POTS service (plain old telephone service) or, in the alternative, an ISDN or the like, connection. The telephone terminal of the reseller may be a POTS telephone or may comprise a call center including an ACD or automatic call distributor. The reseller also maintains a computer station shown at 112.

This may constitute a workstation or a personal computer (PC). The computer station 112 is provided with an Internet connection, either through an Internet service provider (ISP) or by direct connection.

The end user customer at 108 is provided with a telephone connection to the PSTN shown at 114. The end user customer is usually a merchant engaged in the sale of products or services of any of a variety of types. Such customer is also provided with a computer terminal 116, which may be a workstation or PC. The end user merchant normally engages in print, telephone, and Internet advertising, and thus is provided with an Internet connection which may constitute an ISP or direct connection.

The provider at 104 is equipped with a telephone switch 118, server 120, and database 122. The telephone switch 118 is connected to the PSTN 102, while the server 120 is connected the Internet 100. The telephone switch, server, and database are connected to the local area network or LAN 124.

Figure 2:
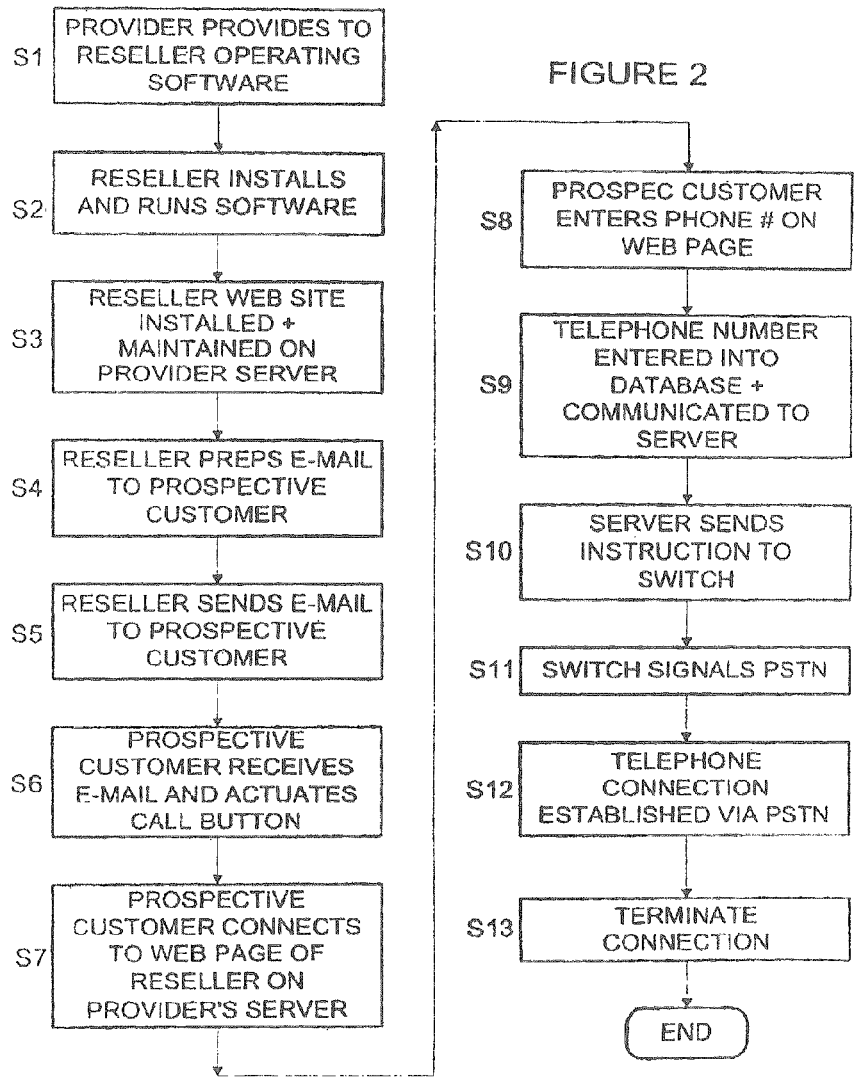
FIG. 2 is a simplified flow diagram illustrating a methodology showing one example of using the system of the invention.
Figure 3:
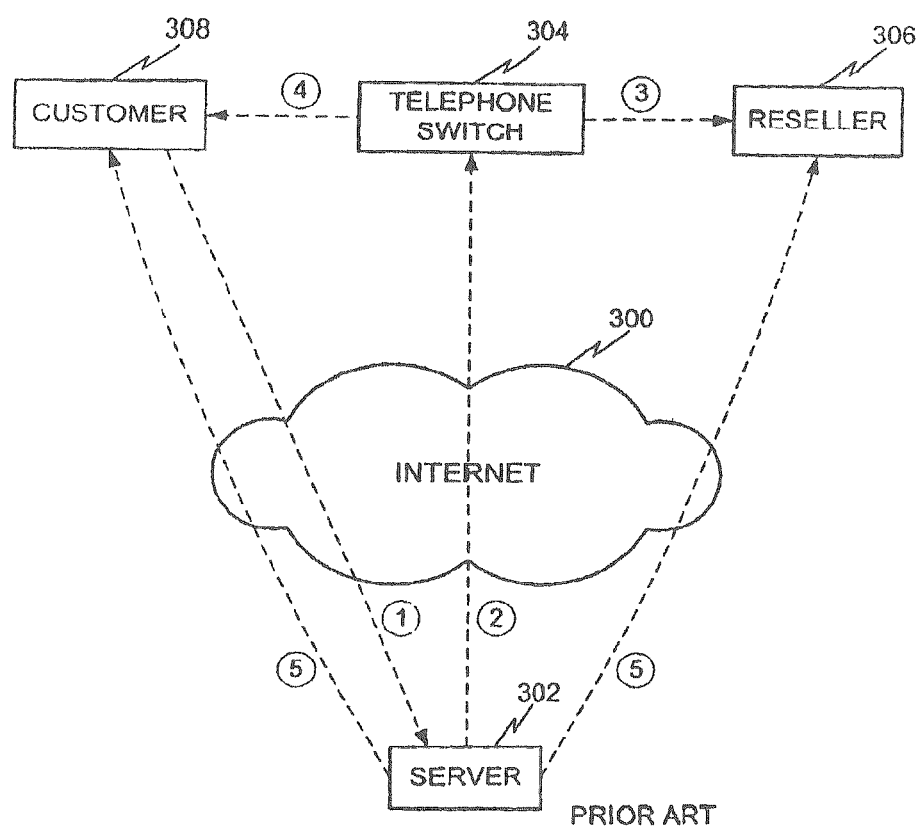
FIG. 3 is a simplified diagram illustrating a prior art system.

Referring to the flow diagram in FIG. 2, the operation of the system of the invention according to a preferred embodiment is now described. At S1 the service provider provides to the reseller operating software for use in carrying out the methodology of the invention. This software may be physically delivered to the reseller but is conveniently provided via the Internet.

At S2 the reseller installs and runs the software in his computer terminal 112.

At S3 the web site of the reseller is installed and maintained on the server 120 of the provider.

At S4 the reseller uses the software obtained from the provider and prepares an e-mail which contains or has attached a hypertext markup language (HTML) file. That file includes a hyperlink telecommunication initiating trigger. This is sometimes referred to as a call button, hot link, or hyperlink. The reseller addresses the e-mail to a prospective customer of his choosing. To this end, the reseller may collect the e-mail addresses of individuals, businesses, or associates who he may desire to enable to utilize a call button.

At S5 the reseller sends the e-mail to the named addressee or addressees.

At S6 the prospective customer addressee examines the e-mail and activates the included call button.

At S7 the activation of the call button results in the prospective customer being connected via the Internet to the web page of the reseller. This page is maintained on the provider's server 120. That web page preferably includes dialogue requesting the prospective customer to enter their address and other information, including a telephone number at which the prospective customer desires to be contacted.

At S8 the prospective customer enters their telephone number as a minimum response to the request.

At S9 the telephone number which the prospective customer entered on the reseller's web page in the provider's server 120, is communicated to and entered into the provider's database 122 which is associated with the server.

At S10 the server sends instructions to the telephone switch 118. These instructions may be analog or digital. The server may have a modem connection to the telephone switch and send DTMF (dual tone multiple frequency) signals to the switch to effect a connection to the PSTN. On the other hand, the server may use a direct packet data connection to the telephone switch.

At S11 the telephone switch signals the PSTN end office to which it is connected.

At S12 the PSTN end office establishes a telephone connection from the end user customer 108 to the reseller 106. As an alternative, the directions to the switch may result in first establishing a connection from the switch to the reseller call center. After the reseller call center is alerted to an incoming call from the specified end user customer, a connection is made from the switch to the customer. These two connections are then bridged at the switch 118.

At S13 the telephone connection through the PSTN between the reseller and the end user customer is terminated by one of the parties and the process comes to an end.

It will be apparent to those skilled in the art that the system and methodology of the invention enables one party sending to another party by electronic mail a hypertext markup language (HTML) file containing a telecommunication initiating trigger, responding to actuation of the initiating trigger at least in part by obtaining a telephone number of the other party, the telephone number being obtained at least in part by transmission control protocol/Internet protocol (TCP/IP) communication between the other party and a web page on the server.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

We claim:

1. A method, comprising:
   operations performed by a service provider operating a computer server for establishing a connection between a first entity other than the service provider and a second entity other than the service provider, wherein the operations comprise:
   providing software and related services to implement a push-to-talk initiating trigger button, by the service provider, to a computing device of the first entity;
   maintaining a web page including a request to enter a telephone number;
   connecting the web page via the Internet to a computing device of the second entity as a result of activation of the push-to-talk initiating trigger button embedded in a hypertext markup language (HTML) file received from the first entity by the computing device of the second entity;
   receiving, through the web page, a telephone number of the second entity; and
   connecting the first entity and the second entity in response to receiving the telephone number.

2. The method of claim 1, wherein connecting the first entity and the second entity comprises:
   establishing a first connection between a telephone switch and the first entity;
   establishing a second connection between the telephone switch and the telephone number of the second entity; and
   bridging the first connection and the second connection.

3. The method of claim 1, wherein the push-to-talk initiating trigger button includes a HTML link.

4. The method of claim 1, further comprising:
   providing an instruction to the first entity to embed the HTML file in an e-mail message and transmit the e-mail message to the second entity.

5. The method of claim 1, wherein connecting the first entity and the second entity comprises:
   transmitting a signal to a public switched telephone network (PSTN) through a telephone switch, wherein the telephone switch is coupled with the computer server of the service provider.

6. A system for a service provider to establish a connection between a first entity other than the service provider and a second entity other than the service provider, the system comprising:
   a computer server of the service provider programmed to, following activation by the second entity of a push-to-talk telecommunication initiating trigger button embedded in a hypertext markup language (HTML) file received from the first entity, wherein software and related services were previously provided by the service provider to the first entity for implementing the push-to-talk telecommunication initiating trigger button, receive through a web page that a) includes a request to enter a telephone number and b) is connected via the Internet to a computing device of the second entity, a telephone number of the second entity and in response connect the first entity and the second entity.

7. The system of claim 6, wherein the computer server is programmed to connect the first entity and the second entity by establishing a first connection between a telephone switch and the first entity, establishing a second connection between a telephone switch and the telephone number of the second entity, and bridging the first connection and the second connection.

8. The system of claim 6, wherein the push-to-talk telecommunication initiating trigger button includes a HTML link.

9. The system of claim 6, wherein the computer server is further programmed to provide an instruction to the first entity to embed the HTML file in an e-mail message and transmit the e-mail message to the second entity.

10. The system of claim 6, wherein the computer server is programmed to connect the first entity and the second entity by transmitting a signal to a public switched telephone network (PSTN) through a telephone switch.

11. A method comprising:
operations performed by a service provider for establishing a voice connection between a first entity other than the service provider and a second entity other than the service provider, where the voice connection is established after the second entity activates a push to talk telecommunication initiating trigger button that is embedded in a hypertext markup language (HTML) file, wherein the operations comprise:
maintaining a web page on a web server, the web page including a request to enter a telephone number;
generating, by the service provider, software and related services to implement a push-to-talk initiating trigger button, the software and related services configured to establish a connection to the web page on the web server in response to activation of the push-to-talk initiating trigger button, the push-to-talk initiating trigger button capable of being embedded in the HTML file;
providing the software and related services to the first entity;
receiving, by a computer server of the service provider, a telephone number of the second entity, the telephone number being received through the web page; and
signaling, by the computer server of the service provider, the voice connection to be established automatically between the first entity and the telephone number of the second entity in response to receiving the telephone number.

12. The method of claim 11, wherein signaling the voice connection to be established comprises:
instructing a telephone switch to establish a first voice connection with the first entity; and
instructing a telephone switch to establish a second voice connection with the telephone number of the second entity,
wherein the first voice connection and the second voice connection are then bridged for communication between the first entity and the second entity.

13. The method of claim 11, wherein the push-to-talk telecommunication initiating trigger button includes a HTML link.

14. The method of claim 11, further comprising:
providing an instruction to the first entity to embed the HTML file in an e-mail message and transmit the e-mail message to the second entity.

15. The method of claim 11, wherein signaling the voice connection to be established comprises:
signaling a telephone switch to transmit a signal to a public switched telephone network (PSTN), wherein the telephone switch is coupled with the computer server of the service provider.

16. A system for a service provider to establish a voice connection between a first entity other than the service provider and a second entity other than the service provider, wherein the voice connection is established after the second entity activates a push to talk telecommunication initiating trigger button that is embedded in a hypertext markup language (HTML) file, the system comprising:
a computer server of the service provider programmed to a) establish, in response to activation of a push-to-talk telecommunication initiating trigger button embedded in the HTML file received from the first entity, wherein software and related services were previously provided by the service provider to the first entity for implementing the push-to-talk telecommunication initiating trigger button and the HTML file is capable of being embedded in an e-mail message, a connection to a web page that includes a request to enter a telephone number, and b) receive, through the webpage, a telephone number of the second entity and, in response to receipt of the telephone number of the second entity, signal the voice connection to be established automatically between the first entity and the telephone number of the second entity.

17. The system of claim 16, wherein the computer server is programmed to signal the voice connection to be established by instructing a telephony switch to establish a first voice connection with the first entity, and a second voice connection with the telephone number of the second entity, wherein the first voice connection and the second voice connection are to be bridged for communication between the first entity and the second entity.

18. The system of claim 16, wherein the push-to-talk telecommunication initiating trigger button includes a HTML link.

19. The system of claim 16, wherein the computer server is further programmed to provide an instruction to the first entity to embed the HTML file in the e-mail message and transmit the e-mail message to the second entity.

20. The system of claim 16, wherein the computer server is programmed to signal the voice connection to be established by signaling a public switched telephone network (PSTN) through a telephone switch.

21. A method, comprising:
operations performed by a service provider operating a computer server for establishing a connection between a first entity other than the service provider and a second entity other than the service provider, wherein the operations comprise:
providing software and related services to implement a push-to-talk initiating trigger button, by the service provider, to a computing device of the first entity;
maintaining a web page including a request to enter a telephone number;
connecting the web page via the Internet to a computing device of the second entity as a result of activation of the push-to-talk initiating trigger button embedded in a e-mail message received from the first entity by the second entity;
receiving, through the web page, a telephone number of the second entity; and
connecting the first entity and the second entity in response to receiving the telephone number.

22. The method of claim 21, wherein connecting the first entity and the second entity comprises:
establishing a first connection between a telephone switch and the first entity;
establishing a second connection between a telephone switch and the telephone number of the second entity; and
bridging the first connection and the second connection.

23. The method of claim 21, wherein the push-to-talk initiating trigger button includes a hypertext markup language (HTML) link.

24. The method of claim 21, further comprising:
providing an instruction to the first entity to embed the push-to-talk initiating trigger button in the e-mail message and transmit the e-mail message to the second entity.

25. The method of claim 21, wherein connecting the first entity and the second entity comprises:
transmitting a signal to a public switched telephone network (PSTN) through a telephone switch, wherein the telephone switch is coupled with the computer server of the service provider.

26. A system for a service provider to establish a connection between a first entity other than the service provider and a second entity other than the service provider, the system comprising:
a computer server of the service provider programmed to, following activation by the second entity of a push-to-talk telecommunication initiating trigger button embedded in a e-mail message received from the first entity, wherein software and related services were previously provided by the service provider to the first entity for implementing the push-to-talk telecommunication initiating trigger button, receive through a web page that a) includes a request to enter a telephone number and b) is connected via the Internet to a computing device of the second entity, a telephone number of the second entity and in response connect the first entity and the second entity.

27. The system of claim 26, wherein the computer system is programmed to connect the first entity and the second entity by establishing a first connection between a telephone switch and the first entity, establishing a second connection between a telephone switch and the telephone number of the second entity, and bridging the first connection and the second connection.

28. The system of claim 26, wherein the push-to-talk telecommunication initiating trigger button includes a hypertext markup language (HTML) link.

29. The system of claim 26, wherein the computer server is further programmed to provide an instruction to the first entity to embed the push-to-talk telecommunication initiating trigger button in the e-mail message and transmit the e-mail message to the second entity.

30. The system of claim 26, wherein the computer server is programmed to connect the first entity and the second entity by transmitting a signal to a public switched telephone network (PSTN) through a telephone switch.

* * * * *